US012676320B2

(12) United States Patent
Dommann et al.

(10) Patent No.: US 12,676,320 B2
(45) Date of Patent: Jul. 7, 2026

(54) ARTICLE HAVING A HEAT-INSULATING COATING SYSTEM

(71) Applicant: FORSCHUNGSZENTRUM JÜLICH GMBH, Jülich (DE)

(72) Inventors: Christoph Dommann, Bonn (DE); Daniel Emil Mack, Cologne (DE); Robert Vaßen, Herzogenrath (DE); Martin Tandler, Viersen (DE)

(73) Assignee: FORSCHUNGSZENTRUM JÜLICH GMBH, Jülich (DE)

( * ) Notice: Subject to any disclaimer, the term of this patent is extended or adjusted under 35 U.S.C. 154(b) by 69 days.

(21) Appl. No.: 18/039,211

(22) PCT Filed: Dec. 16, 2021

(86) PCT No.: PCT/EP2021/086149
§ 371 (c)(1),
(2) Date: May 26, 2023

(87) PCT Pub. No.: WO2022/152495
PCT Pub. Date: Jul. 21, 2022

(65) Prior Publication Data
US 2024/0297313 A1 Sep. 5, 2024

(30) Foreign Application Priority Data
Jan. 14, 2021 (DE) ........................ 10 2021 200321.4

(51) Int. Cl.
*H01M 8/0232* (2016.01)
*B23K 26/144* (2014.01)
(Continued)

(52) U.S. Cl.
CPC ......... *H01M 8/0232* (2013.01); *B23K 26/144* (2015.10); *B23K 26/342* (2015.10);
(Continued)

(58) Field of Classification Search
CPC ............ H01M 8/0232; H01M 8/0236; H01M 8/0245; B23K 26/144; B23K 26/342;
(Continued)

(56) References Cited

U.S. PATENT DOCUMENTS 4,321,311 A * 3/1982 Strangman .............. C23C 28/00
428/629
5,238,752 A 8/1993 Duderstadt et al.
(Continued)

FOREIGN PATENT DOCUMENTS

DE 60026973 T2 8/2006
EP 1295964 A2 3/2003
(Continued)

OTHER PUBLICATIONS

Kumar, et al., "Columnar Thermal Barrier Coatings Produced By Different Thermal Spray Processes," J. Term Spray Tech, Feb. 19, 2021, 30: pp. 1437-1452.
(Continued)

*Primary Examiner* — Michael E. La Villa
(74) *Attorney, Agent, or Firm* — Dickinson Wright PLLC

(57) ABSTRACT

A system comprising a substrate and a ceramic thermal barrier layer formed of columns which is applied to the substrate, characterized in that the columns are spatially separated from each other at the substrate or at least hardly contact each other is disclosed. A method for producing the system by laser welding is also disclosed. The disclosed material makes it possible to produce durable, heat-resistant components that can be used, for example, in turbines or in metal-supported fuel cells.

17 Claims, 8 Drawing Sheets

(51) Int. Cl.

| | |
|---|---|
| *B23K 26/342* | (2014.01) |
| *B23K 103/00* | (2006.01) |
| *B28B 1/00* | (2006.01) |
| *B32B 15/04* | (2006.01) |
| *B32B 18/00* | (2006.01) |
| *B33Y 80/00* | (2015.01) |
| *C23C 4/11* | (2016.01) |
| *C23C 4/12* | (2016.01) |
| *C23C 24/10* | (2006.01) |
| *C23C 30/00* | (2006.01) |
| *F01D 5/00* | (2006.01) |
| *F01D 5/28* | (2006.01) |
| *F01D 25/00* | (2006.01) |
| *F01D 25/08* | (2006.01) |
| *H01M 8/0236* | (2016.01) |
| *H01M 8/0245* | (2016.01) |
| *B33Y 10/00* | (2015.01) |

(52) U.S. Cl.
CPC ............ *B32B 15/04* (2013.01); *B32B 15/043* (2013.01); *B32B 18/00* (2013.01); *B33Y 80/00* (2014.12); *C23C 4/11* (2016.01); *C23C 4/12* (2013.01); *C23C 24/10* (2013.01); *C23C 24/103* (2013.01); *C23C 30/00* (2013.01); *C23C 30/005* (2013.01); *F01D 5/00* (2013.01); *F01D 5/28* (2013.01); *F01D 5/288* (2013.01); *F01D 25/005* (2013.01); *F01D 25/08* (2013.01); *H01M 8/0236* (2013.01); *H01M 8/0245* (2013.01); *B23K 2103/52* (2018.08); *B28B 1/001* (2013.01); *B33Y 10/00* (2014.12); *F01D 25/00* (2013.01); *F05D 2230/232* (2013.01); *F05D 2230/234* (2013.01); *F05D 2300/2118* (2013.01); *Y10T 428/12438* (2015.01); *Y10T 428/12458* (2015.01); *Y10T 428/12479* (2015.01); *Y10T 428/12597* (2015.01); *Y10T 428/12604* (2015.01); *Y10T 428/12611* (2015.01); *Y10T 428/12618* (2015.01); *Y10T 428/12931* (2015.01); *Y10T 428/12937* (2015.01); *Y10T 428/12944* (2015.01); *Y10T 428/12993* (2015.01)

(58) Field of Classification Search
CPC .... B23K 2103/52; B33Y 80/00; B33Y 10/00; C23C 4/11; C23C 4/12; C23C 24/10; C23C 24/103; C23C 30/00; C23C 30/005; F01D 2230/232; F01D 2230/234; F01D 5/288; F01D 5/28; F01D 5/00; F01D 25/00; F01D 25/005; F01D 25/08; F01D 2300/2118; B28B 1/001; Y10T 428/12597; Y10T 428/12604; Y10T 428/12611; Y10T 428/12618; Y10T 428/12438; Y10T 428/12458; Y10T 428/12479; Y10T 428/12944; Y10T 428/12937; Y10T 428/12931; Y10T 428/12993; B32B 15/04; B32B 15/043; B32B 18/00
See application file for complete search history.

(56) References Cited

U.S. PATENT DOCUMENTS

| | | | | |
|---|---|---|---|---|
| 5,830,586 A | * | 11/1998 | Gray | C23C 4/134 428/678 |
| 7,510,743 B2 | | 3/2009 | Subramanian | |
| 2003/0152814 A1 | * | 8/2003 | Gupta | C23C 28/325 428/629 |
| 2003/0228441 A1 | * | 12/2003 | Subramanian | C23C 4/02 428/120 |
| 2008/0145629 A1 | | 6/2008 | Anoshkina et al. | |
| 2012/0276352 A1 | * | 11/2012 | Liu | F01D 5/288 428/312.8 |

FOREIGN PATENT DOCUMENTS

| | | | |
|---|---|---|---|
| EP | 1295964 | A3 | 1/2004 |
| EP | 1645652 | A1 | 4/2006 |
| EP | 2439306 | A1 | 4/2012 |
| EP | 2892686 | A1 | 7/2015 |
| WO | 2000037711 | | 6/2000 |
| WO | 2003087422 | A1 | 10/2003 |
| WO | 2016060799 | A1 | 4/2016 |
| WO | 2011085376 | A1 | 7/2021 |

OTHER PUBLICATIONS

International Search Report with English Translation and Written Opinion for PCT Application No. PCT/EP2021/086149, dated Jul. 21, 2022, pp. 1-11.

* cited by examiner

FZJ : IEF 2010   EHT = 7.99 kV   Detector = QBSD   WD =   9 mm   100µm

4

3

2

1

1

4

ARTICLE HAVING A HEAT-INSULATING COATING SYSTEM

CROSS-REFERENCE TO RELATED APPLICATIONS

This present application is a national stage application of International Patent Application No. PCT/EP2021/086149, filed Dec. 16, 2021, which claims priority to German Patent Application No. 10 2021 200 321.4, filed Jan. 14, 2021, the disclosures of which are hereby incorporated by reference in their entireties.

TECHNICAL FIELD

The invention relates to a system comprising a ceramic thermal barrier layer and a method for producing the system.

Turbine blade components in aircraft engines and components of stationary gas turbines may be exposed to temperatures exceeding 1000° C. or even 2000° C. Such components are protected from heat by thermal barrier layers. The present invention relates to such thermal barrier layers.

Heating and cooling of such components can cause destructive thermal stresses. Thermal barrier layers may therefore have a columnar structure to reduce the occurrence of thermal stresses.

BACKGROUND OF THE ART

The publication WO 03/087422 A1 discloses the production of a thermal barrier layer with columnar structures by a vapor deposition process (EB-PVD) as well as by plasma spraying (LPPS). The columnar structures produced by plasma spraying run irregularly, i.e., the diameter varies significantly and the course may deviate from a substantially straight-line course. The columns are arranged in an unevenly distributed manner. At the inside of the thermal barrier layer, i.e. at the substrate, there are no gaps between columns. The irregular course and the uneven distribution of the columns make it clear that it is not possible to produce individual columns in a controlled manner using the plasma spraying process known from publication WO 03/087422 A1.

The publication EP 2 439 306 A1 teaches to evaporate ceramic material at least partially in a plasma jet to create a thermal barrier layer with columnar structure on a metallic substrate. Thermal plasma spraying, low-pressure plasma spraying (LPPS) or plasma spray—physical vapor deposition (PS-PVD) is proposed. The columnar structures illustrated in the publication EP 2 439 306 A1 correspond to the columnar structures illustrated in the publication WO 03/087422 A1.

Publication WO 00/37711 A1 discloses producing thermal barrier layers with columnar structures by vapor deposition (EB-PVD) or by chemical vapor deposition (CVD). A microscopic image of thermal barrier layers with columnar structures produced by vapor deposition shows very irregular courses of columnar structures. On the particularly problematic inner side of the thermal barrier layer, there are hardly any gaps between the columns.

The publication U.S. Pat. No. 5,238,752 A discloses the producing of a thermal barrier layer by electron beam assisted physical vapor deposition (EB-PVD) with a columnar grain structure. From the indication of grain structure, it can be concluded that the columns are porous.

SUMMARY

A method for repairing a component of a turbomachine by laser coating is known from the publication EP 2 892 686 B1. A laser beam is used to repair its surface.

It is an object of the invention to provide a durable thermal barrier layer. It is also a task of the invention to provide a method for producing such a thermal barrier layer.

The task of the invention is solved by a thermal barrier layer having the features of the first claim. A method for producing a thermal barrier layer comprises the features of the additional claim.

The problem of the invention is solved by a system comprising a substrate and a thermal barrier layer formed of columns applied to the substrate. The columns consist of a ceramic material.

DESCRIPTION OF THE DRAWINGS

The invention is illustrated in more detail below with the aid of figures. They show

DESCRIPTION OF THE PREFERRED EMBODIMENTS

Figure 1:
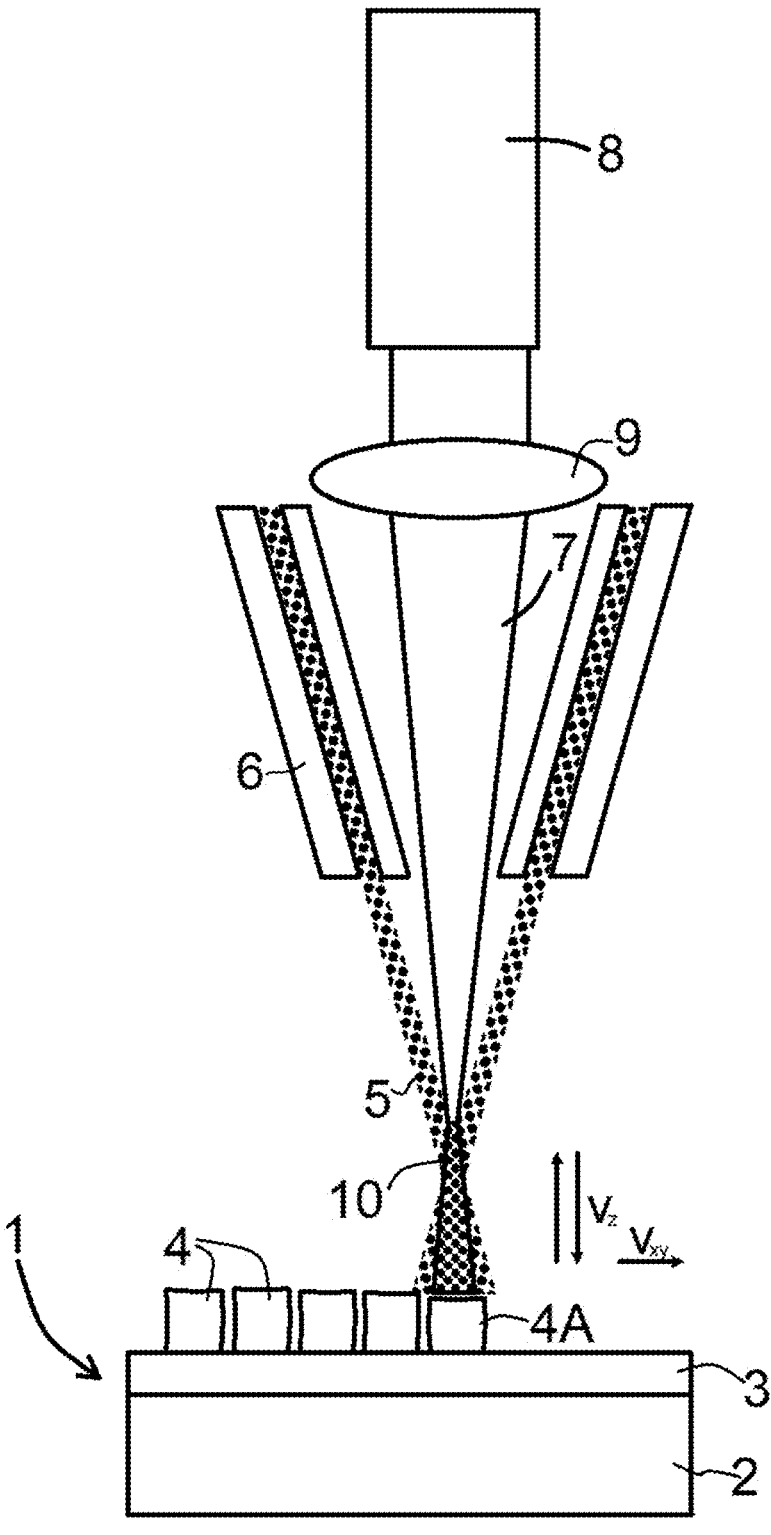
FIG. 1: schematic representation of the process.

A thermal barrier layer in the sense of the present invention is a flat area which is such that the substrate underneath is protected from heat. The thermal barrier layer significantly increases the service life of the substrate. This statement refers to the case where the substrate is regularly exposed to temperatures exceeding 1000° C. Thermal barrier layers therefore have a thickness of several 100 μm to provide adequate protection against heat. The surface area of the thermal barrier layer can be 10000 mm$^2$ and significantly larger. The thermal barrier layer according to the invention can be integrated into a thermal barrier layer otherwise designed differently, because the method according to the invention can be used to repair local defects of a thermal barrier layer. The surface of a thermal barrier layer according to the invention, i.e. the area above the substrate, can therefore be only a few 10 mm², for example 5 mm×5 mm, i.e. 25 mm². However, such areas are often at least 100 mm², for example at least 10 mm×10 mm.

The thermal barrier layer is formed by columns protruding perpendicularly (vertically) or at least substantially perpendicularly from the surface of the substrate. Each column consists of ceramic material. Consequently, the system according to the invention comprises a ceramic thermal barrier layer.

In principle, the columns are spatially separated from each other at the substrate, i.e. at the underside of the thermal barrier layer. Adjacent columns of the thermal barrier layer then do not contact (touch) each other at the underside of the thermal barrier layer. Then the underside of the thermal barrier layer can follow the expansion (stretching) of the substrate in an improved manner. Stresses imposed by expansion of the substrate are avoided. In the unconnected columns and in the strongly limited column volume close to the interface, there is no buildup of critical stress energy necessary for crack formation. Also, expansion of the columns due to heating of the thermal barrier layer at the substrate is possible without an expanding column damaging adjacent columns at the substrate, although this is of secondary importance. At the particularly critical underside, the thermal barrier layer according to the invention is particularly expansion tolerant. Long-lasting cohesion between the substrate surface and the thermal barrier layer can thus be ensured.

However, it is not absolutely necessary that the columns do not contact (touch) each other at all, since the method according to the invention also makes it possible to arrange the columns uniformly according to a pattern in such a way that the columns hardly contact each other for the most part, at least at the substrate surface. Also, in the case of a pattern, the columns always contact each other in approximately the same way, i.e. also according to a pattern. In principle, there are a maximum of six different contact points between a column and its neighboring columns. If the columns are approximately circular in section, then it is possible that a column has a total of up to six contact points with neighboring columns. However, more than six contact points are then not possible if the diameters of the columns are always approximately the same. Viewed along the circumference, each contact point is many times smaller than the circumference of the respective column. Even if all contact points seen along the circumference are added up, then the result of the sum is in principle smaller than half the circumference of the respective column.

The columns may have an approximately circular cross-section. As a result, the circumferential surface of one column barely contacts the circumferential surface of neighboring columns at the base. This is sufficient to obtain long-lasting thermal barrier layers.

In particular, the thermal barrier layer can protect against temperatures of more than 1000° C., preferably of more than 1500° C., especially preferably of 1800° C. and more. If the melting temperature of the ceramic material is exceeded, the thermal barrier layer can no longer protect against heat at the latest. A thermal barrier layer in the sense of the present invention can therefore in principle not protect against temperatures which lie between 2400° C. and 3000° C. However, with a suitable choice of ceramic material, the thermal barrier layer can protect against temperatures higher than 2400° C.

The ceramic material of the thermal barrier layer can be dense, i.e. non-porous, at the substrate and consequently at the underside of the thermal barrier layer. This does not exclude the possibility that small pores may be present in isolated cases due to manufacturing defects.

Cavities (hollow spaces) can be deliberately incorporated above the substrate in order to improve thermal insulating properties. Each column can therefore be dense at the substrate and still have one or more cavities at a selected distance above the substrate. If there are several cavities per column, they are generally arranged one above the other, i.e. not next to each other. These are individual cavities that have been selectively produced in an otherwise dense ceramic material. In contrast to a porous material, there is generally no uniform distribution of cavities, since these have been produced locally in a targeted manner. Also, cavities are generally arranged one above the other and not side by side. However, a staggered arrangement of cavities within a column is regularly possible.

The diameter of the columns can be larger than 100 µm, preferably larger than 300 µm. The diameter of a column may be at least 200 µm, preferably at least 400 µm. The diameter of the columns may be smaller than 900 µm, preferably smaller than 700 µm. For example, the diameter of a column can expediently be up to 800 µm, i.e. 0.8 mm, or up to 1000 µm, i.e. up to 1 mm. However, larger diameters are also possible.

The columns of the thermal barrier layer can be several 100 µm high, but also several millimeters high. For example, a column can be at least 400 µm, at least 2 mm or at least 4 mm high. For example, the columns can be up to 8 mm or up to 10 mm high. In principle, however, greater heights are also possible.

Compared to the height of a column, a column can be very thin. The height of each column can, for example, exceed the diameter of each column by a factor of 8 or 10. This achieves that air cushions with a correspondingly large height can be suitably formed between the columns, which contribute to thermal insulation. This applies at least to applications in which the thermal barrier layer is not exposed to excessive external air currents. If a single column is comparatively thin and the diameter is, for example, no more than 0.8 mm or no more than 0.6 mm, there can advantageously be a correspondingly large number of air pockets per unit area. Good thermal insulation or heat insulation is thus possible.

The distance between two columns is preferably at least 2 µm at the substrate and thus at the underside of the thermal barrier layer, preferably at least 5 µm, in order to provide a particularly durable thermal barrier layer. The distance between two columns is preferably at the substrate and thus at the underside of the thermal barrier layer smaller than 100 µm, preferably smaller than 50 µm, in order to provide a thermal barrier layer with good thermal insulation.

The diameter of a column is preferably always substantially the same. Thus, along the height of a column, the diameter then hardly changes. Exceptions to this may be areas that have been deliberately widened, for example to provide a completely or at least partially closed surface that can protect against contamination.

The diameter of a column can vary from column to column. Thus, a first column having a first diameter may have been produced and a second column having a second diameter may have been produced adjacent thereto.

The columns may be widened above the substrate such that they are interconnected or connected to each other above the substrate. The columns may be connected to each other at the same or at least similar height. The columns may be connected to each other in a layer shape above the substrate. There may be areas between the columns above the substrate that completely shield underlying areas from the outside. Shielding may serve to prevent air exchange to provide good protection from heat. Such shielding need not be completely closed. The shielding may be closed in such a way that an inner region of the thermal barrier layer is reliably protected from contamination.

The thermal barrier layer may be formed by first and second columns. The second columns may be applied to the first columns. The second columns may be offset from the first columns. The first columns are then located in a first plane (layer) and the second columns are located in a second plane that is above the first plane. The offset arrangement results in better forming of air cushions to provide good protection against heat.

Two-layer thermal barrier planes with two different ceramic materials also have very good properties. The material of the first plane is then different from the material of the second plane.

It is also possible to produce columns of different materials within one plane. A first column of a first plane then consists of a first material and a second column of a first plane then consists of a different second material. This applies in the same way to an optionally provided second level, which can be located above the first level.

By selecting different materials, a thermal barrier layer can be optimized for specific applications.

The upper side of the substrate may be formed by an adhesion promoter layer. In the case of a component, upper side means the outer side, i.e. an outer surface. The adhesion promoter layer may consist of a ceramic or a metal. The adhesion promoter layer may be formed of highly alloyed nickel- or cobalt-based metals, as well as oxide dispersion strengthened metals. For example, the adhesion promoter layer may consist of MCrAlY. Alumina is particularly well suited for environmental barrier coating applications. Possible other materials from which an adhesion promoter layer may be formed also include: platinum aluminides $(Ni,Pt)Al_x$ (from alitizing Ni-based Pt), silicon Si (for SiC-based CMCs, alumina (for $Al_2O_3$-based CMCs). An adhesion promoter layer in the sense of the present invention is present when oxidation and/or corrosion protection is achieved by the adhesion promoter layer. The longevity of the system in intended use would therefore be significantly lower if the adhesion promoter layer did not exist.

An adhesion promoter layer can be at least 20 μm or 100 μm thick to achieve the desired effect. For reasons of expediency, the thickness of the adhesion promoter layer should not exceed 300 μm or 500 μm.

The adhesion promoter layer may be applied to a component consisting of a metal. The component then consists essentially of a metal. It may be a metal alloy. There are then further one or more layers on the component, wherein one of the layers is a thermal barrier layer according to the invention. Typically, high-alloy poly- or single-crystal nickel-based alloys are used as the metal alloy (such as Inconel 738, CMSX-4, Inconel 718). However, oxide dispersion strengthened alloys can also be used. Chromium and iron-based steels as well as oxide dispersion strengthened variants are also among possible component materials such as (CroFer, FeCrAlY, ITM).

A ceramic layer may be present on the upper side of the adhesion promoter layer to further improve cohesion. The ceramic layer may consist of the same ceramic as the columns. The ceramic layer is basically thin compared to other layers of the system to be as resistant to thermal stress as possible. The ceramic layer is basically thinner than the adhesion promoter layer. The ceramic layer is expediently at least 10 μm, preferably at least 50 μm, thick. The ceramic layer is expediently not thicker than 200 μm, preferably not thicker than 150 μm. The ceramic layer may be porous. The ceramic layer may be dense, i.e. non-porous. Melting of the ceramic layer is possible. Thus, a non-porous structure of the ceramic layer is possible up into the column. Such a ceramic layer in the sense of the present invention has been produced in a targeted and controlled manner, i.e. by a separate coating step.

A top layer may be present on the upper side of the thermal barrier layer to protect the thermal barrier layer from contamination, for example. The top layer may consist of a ceramic material. The ceramic material of the top layer may be different from the ceramic material of the thermal barrier layer. The ceramic material of the top layer may be identical to the ceramic material of the thermal barrier layer.

The component, and thus the system, may be part of a turbine, for example. The turbine may be, for example, an aircraft turbine or a stationary gas turbine. The stationary gas turbine may, for example, be used to generate electricity.

The component, and thus the system, may be part in a metal-supported fuel cell. In a fuel cell, the system may produce the connection between electrolyte or the reactive zone and, for example, perforated or easily produced flat metal (support metal therefore metal-supported), while ensuring uniform gas distribution as well as strain tolerance through the column spacing in the lower region of the column layer.

The system can be applied to anode-supported fuel cells to use a non-porous stable ceramic support and ensure gas distribution with the thermal barrier layer on top, before the sensitive active electrolyte layer of the fuel cell follows. Variable column spacing in rows could even minimize unwanted horizontal thermal gradients during operation.

The system could also be comprised by component carriers for heat treatments in furnaces or heat-loaded parts in combustion engines.

The thermal barrier layer can, for example, consist of $ZrO_2$ fully or partially stabilized with $Y_2O_3$ (YSZ).

Typical ceramic materials for thermal barrier layers (and so-called environmental barrier coatings) include the group zirconia, partially stabilized zirconia, fully stabilized zirconia, hafnium oxide, cerium oxide or aluminum oxide. The partial stabilization of the zirconia is preferably carried out by yttrium oxide, neodymium oxide and/or ytterbium oxide (in more recent developments also the series of rare earths or Ta, Ti, . . . ). In addition, important classes of materials are the groups of pyrochlore, perovskites, hexaaluminates, garnets or spinels.

The group of pyrochlores includes, for example, $La_2Zr_2O_7$, $La_2Hf_2O_7$, $Gd_2Zr_2O_7$ and mixed series with preferably rare earth elements.

The group of perovskites includes for example zirconates like $SrZrO_3$ or $BaZrO_3$, aluminates like $YAlO_3$ and also complex perovskites like $(Ca,Sr)ZrO_3$, $(Gd,La)AlO_3$ or $Ba(Mg_{1/3}Ta_{2/3})O_3$ and $La(Al_{0.25}Mg_{0.5}Ta_{0.25})O_3$.

The group of spinels e.g. $MgAl_2O_4$, $MgCr_2O_4$.

Examples of the (hexa-)aluminates are $LaAl_{11}O_{18}$ with various co-dopings (e.g. $LaLiAl_{11}O_{18.5}$).

Examples of garnets are $Y_3Al_5O_{12}$ (YAG), wherein again mixed series with preferably rare earth elements are used.

Because of the low fracture toughness of the new thermal barrier layer materials compared to YSZ, they are usually used in a double layer design with interlayer of YSZ.

In the range of CMC substrates or for lower application temperatures, rare earth silicates or the $Al_2O_3$—$SiO_2$ mixed series including mullite are also commonly used, for example.

The invention also relates to a method for producing a system according to the invention. According to the invention, a ceramic column of the thermal barrier layer is made from a powder that is welded by a laser. The powder is delivered by one or more powder delivery devices to the location where a ceramic column is to be formed. Light from a laser is directed to the location where the powder is to be welded such that a column is formed. Powder grains are welded in such a way that a column is formed. Powder is preferably fed continuously and uniformly to the location where a column is to be formed. By suitably moving the laser and/or an optics for the laser, a desired shape of a body welded together from the powder grains can be produced. Powder grains can be melted by the light of the laser to form a dense body, which is thus non-porous.

Through this process, the size and shape of a column can be produced in a very controlled manner. It is thus possible to produce columns in such a way that they do not contact each other at the underside of the thermal barrier layer and thus at the substrate. It is also possible to selectively widen columns above the substrate, so that they contact each other, for example. It is also possible to selectively incorporate one or more cavities in each column to improve thermal insulation properties. It is possible to produce first columns in a first plane and subsequently second columns in a second plane above the first plane, the second columns being offset from the first columns. It is possible to selectively manufacture columns with the same or different diameters. Deviating shapes can also be produced. For example, a column can widen continuously towards the outside of the thermal barrier layer. However, a column can also taper outward or be belly-shaped. Combinations are possible. Thus, it is possible to have a first column taper upward, i.e., toward the outside, and an adjacent column widen upward.

The various desired shapes of a column can be produced in a controlled manner by appropriate movements of the laser and/or an associated optics. For example, moving a laser and/or an associated optics continuously and uniformly away from the weld location in a linear fashion according to the growth rate will produce a body of uniform diameter. By slowing down or stopping a movement of the laser and/or an associated optics, the diameter of a column can be widened at a desired height. Subsequently, the laser and/or an associated optics can be moved further away again at the previous speed to continue the growth of the column.

To produce a column, the laser and/or an associated optics is preferably moved away from the substrate surface perpendicularly (vertically) or at least substantially perpendicularly during welding. Columns can thus be produced that protrude perpendicularly from the substrate surface.

However, the columns can also be oblique. Such oblique columns can be produced with the same perpendicular alignment of the laser optics. In this case, one applies a second column offset to the first column and offsets the next one again. Through continuous oblique movement of the coating unit also produce oblique columns can be produced.

The speed of the laser and/or the associated optics at which the laser and/or the associated optics are moved away from the surface of the substrate preferably corresponds to the growth speed of the column. This results in a column that has a uniform diameter. The height of a column produced in this way is limited only by the inherent stability of the column.

If a cavity is to be selectively incorporated into a column, the movement of the laser and/or associated optics away from the substrate surface is first slowed down (braked) without changing the supply of powder. After slowing down, the laser is finally switched off. It has been shown that these process steps can be used to selectively incorporate a single cavity into a column. Subsequently, the production of the column above the cavity can be continued for the time being. A next cavity can then be produced in the same way above the first-mentioned cavity by again first slowing down the movement of the laser and/or the associated optics, and then switching off the laser.

An associated optics exists when the light of the laser first passes through the optics before the laser welds powder. In particular, the optics focuses the light of the laser. Due to the focusing, it is possible to apply heat to the powder in an optimized manner in order to melt the powder.

Preferably, the light of the laser runs perpendicular to the surface of the substrate during manufacturing in order to produce the columns. Powder can then be fed laterally, for example with the aid of an air stream, to the desired location, i.e. the location on the substrate surface where a column is to be produced.

The power of the laser is selected so that the supplied powder can be melted. If the light of the laser is focused by an associated optics, the focus of the laser is preferably within the stream of powder to deliver heat to the powder with maximum energy. The focus of the laser is advantageously located above the surface at which the column is formed. Thus, the powder is melted in a particularly suitable manner.

The invention allows the columns to be arranged in a very regular manner. Thus, a first row of columns can be manufactured with the columns being substantially equally spaced from one another.

A second row of such columns can be arranged adjacent thereto. The second row may be arranged in an offset manner with respect to the first row, in order to achieve the highest possible packing density and at the same time to provide for particularly uniform spacing between the individual columns.

The diameter of columns of a second row can be different from the diameter of columns of a first row in order to increase air cushions between columns and to achieve advantageous thermal insulation properties.

Different diameter can also create a denser packing (pebble principle). Depending on the design/application conditions, this is also advantageous.

FIG. 1 shows a substrate 1 in section. The substrate 1 comprises a metallic base body 2 and an adhesion promoter layer 3 on the upper side of the base body 2. Columns 4 are produced on the adhesion promoter layer 3. FIG. 1 already shows four completed columns 4. The production of a fifth column 4A is shown. For the production of the fifth column 4A, ceramic powder 5 is fed via nozzles 6 with the aid of air to the point where a fifth column 4A is produced. The flow direction of the powder 5 includes an acute angle with the $V_z$ direction, as illustrated by FIG. 1. The $V_z$ direction is the direction perpendicular to the surface of the substrate 1. The flow of the powder 5 is focused on the location where the fifth column 4A is produced. During production, the powder 5 flows uniformly and continuously to this location. Two individual streams of the powder 5 may be directed to the location or site where the fifth column 4A is formed. More than two individual streams of the powder 5 may be directed to the location or site where the fifth column 4A is formed, for example three or four streams. The stream of powder 5 may form a funnel, the bottom of which is then located at the location where the fifth column 4A is made. However, only one stream of powder 5 may suffice to produce a fifth column 4A, but this is less convenient.

The light 7 of a laser 8 travels along the $V_z$ direction. Thus, the light 7 of the laser 8 runs orthogonal or perpendicular to the surface of the substrate 1. The light 7 of the laser 8 is directed to the location where the column 4A is formed. The diameter of the light 7 is much smaller than the diameter of the column 4A to be produced. For example, at the growth point, the diameter of the light in one case was only about 17 μm compared to the column of about 450 μm. In order to be able to suitably adjust the diameter of the light 7, an optics focusing the light 7 is provided, such as a convex optical lens 9. The light 7 is then passed through the optics 9 and thereby focused. It is thus possible to provide a suitably powerful light cone such that the powder 5 can be melted at a suitable location at and on the surface of the column 4A to be manufactured. The focus 10 of the light 7 can advantageously be adjusted such that it is located above the surface of the column 4A to be manufactured, as shown in FIG. 1. The position of the focus 10 of the light 7 is advantageously such that the focus 10 is located within flowing powder, as shown in FIG. 1. Heat is thus supplied to the powder 5 in the maximum possible manner just before the powder 5 impinges on the surface of the column 4A to be produced. The powder is first further heated after impact and thereby finally suitably melted.

During production, the optics 9 is moved upward away from the surface of the substrate 1 in the $V_z$ direction. However, the laser 8 can also be moved upward away from the surface of the substrate 1 in the $V_z$ direction together with the focusing optics 9. The speed of movement corresponds to the growth speed of the column 4A. This allows the previously melted powder 5 to re-solidify, thus producing the column 4A. Alternatively, the substrate could be moved.

Movements principally include acceleration and deceleration (slow-down) processes. For example, an acceleration process allows for pre-treatment (melting of the substrate).

In one case, a column almost exactly 6 mm high was obtained with a programmed 6 mm movement. Thus, the growth rate on average corresponded to the rate of movement of the optics.

Once column 4A has been completed, the laser 8 is switched off. The laser 8 is moved together with the optics 9 and the nozzles 6 in $V_{XY}$ direction, i.e. parallel to the substrate surface, until the position is reached where a next column can be produced at a desired location. The associated optics 9 or the laser 8 with the optics 9 are moved again in $V_z$ direction towards the substrate 1 until a new starting position is reached from which a production of a next column can be started.

The laser can be switched on already in the approach process with deviating laser parameters in order to carry out a pretreatment of the substrate on the base surface of the column to be manufactured.

Moving the nozzles in the $V_z$ direction is not necessary to suitably produce a column. This applies at least if the height of the column is not to be excessive. In principle, however, it is also possible to move the nozzles 8 together with the optics 9 and/or the laser 8 also in $V_z$ direction.

It may be useful to first apply a thin ceramic layer with the aid of the powder in order to improve the adhesion between the adhesion promoter layer 3 and the ceramic material. The thin ceramic layer may be porous.

The described process results in columns 4 that are not porous. If a cavity is to be incorporated into a column 4, the first step is to slow down the movement of the optics 9 and, if necessary, the laser 10. Then the laser 10 is switched off.

To avoid oxidation of the material, the process is expediently carried out in a vacuum or in a shielding gas atmosphere.

Columns have been produced according to the previously described process. A coating unit included nozzles 6, laser 8 and optics 9. The laser used was an Nd-YAG laser with a light wavelength of 1064 nm, namely the TruFiber400 laser of TRUMPF GmbH+Co. KG of Ditzingen, Germany. The laser was used in a TruCell3008 laser unit from TRUMPF GmbH+Co. KG. The divergence of the laser light was 5°. The diameter of the laser focus was 17 μm. The focus of the laser was in the focus of the supplied powder. The diameter of the focus of the powder was approximately 200 μm. The laser was operated both continuously at a power of 15 W and in a pulsed manner at a power of 40 W with a pulse frequency of 1000 Hz and a pulse length of 0.1 ms. The laser was operated both continuously with a power of 15 W (for column production) and for "pre-treatment" with deviating parameters. "Pre-treatment" was used in the case of direct column coating of an adhesion promoter layer. For this, the laser was activated 3 mm vertically above the starting point of the coating. The laser was then moved at (programmed) maximum speed to the starting point of column growth. During this fast procedure, the laser was operated in a pulsed manner with a power of 40 W on average, more precisely with a pulse frequency of 1000 Hz and a pulse length of 0.1 ms at 400 W. The powder used was spherical zirconia partially stabilized with yttrium d50=34 μm of Metco 233B, Oerlicon Metco Pfsffikon, Switzerland. A continuous argon flow was used for powder delivery and for the protective atmosphere. The argon stream was 20 L/min for powder delivery of about 2.5 g/min.

The coating unit was moved to a starting point of coating. The substrate surface was then briefly melted to achieve good adhesion. The coating unit was then moved perpendicular to the substrate surface by a certain height with the laser switched-on. During this process, the applied powder was fed coaxially. In one case, the moving speed averaged 300 mm/min in the $V_z$ direction upward away from substrate 1. This speed corresponded to the growth rate of the produced columns. Thus, the welding direction was perpendicular to the substrate 1 as previously described. Welding was performed under shielding gas to avoid oxidation of the materials used. Towards the end of the production of a column, first the moving speed was slowed down and then the laser was switched off. Homogeneous dense columns with almost exactly the height of the programmed moving path in $V_z$ direction were produced.

Figure 2:
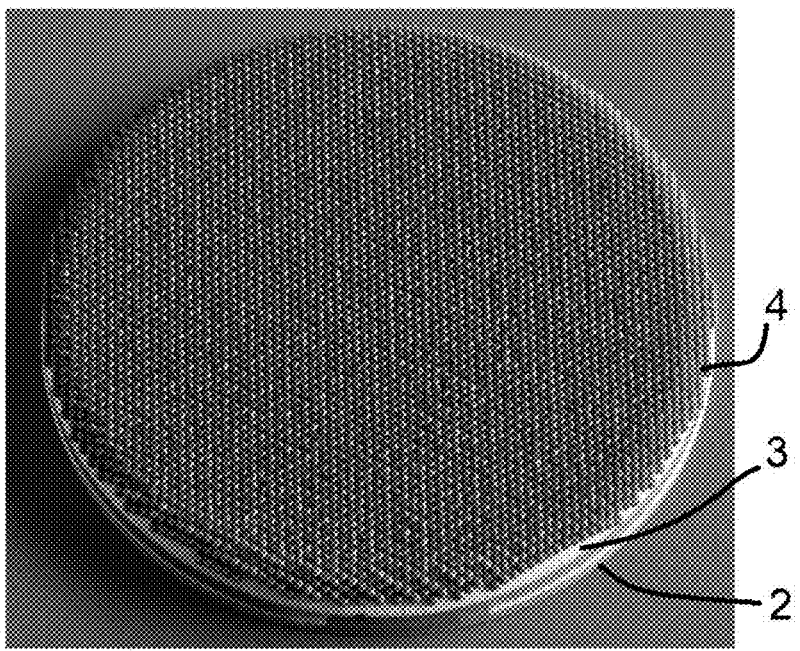
FIG. 2: Top view of a sample with thermal barrier layer.
Figure 3:
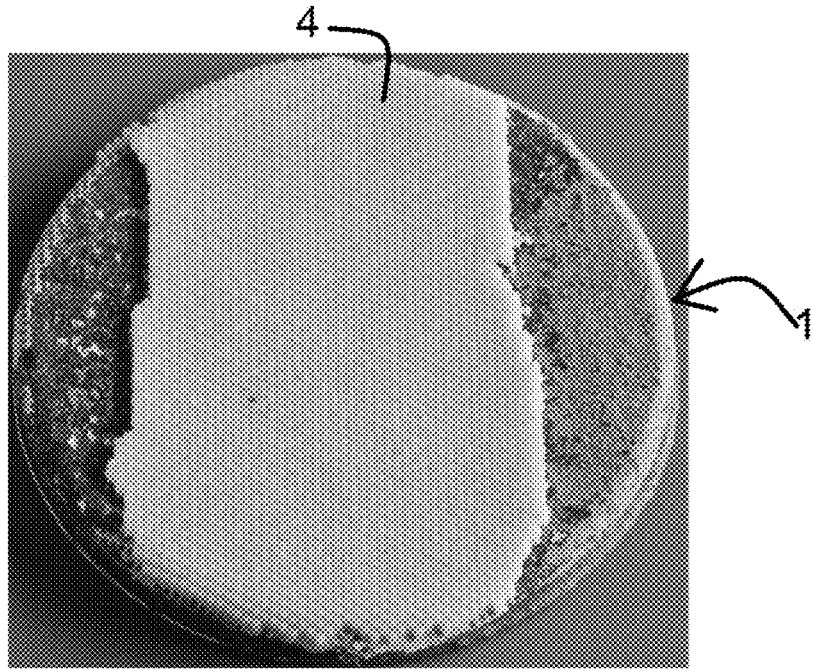
FIG. 3: Top view of the sample of FIG. 2 after thermocycling tests.
Figure 4:
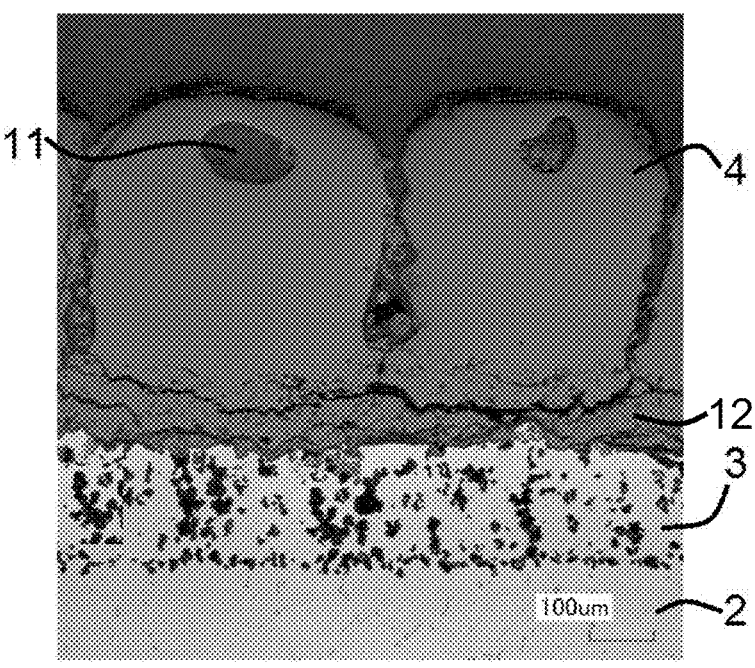
FIG. 4: Photo of a cross-section polish of the sample in FIG. 3.
Figure 5:
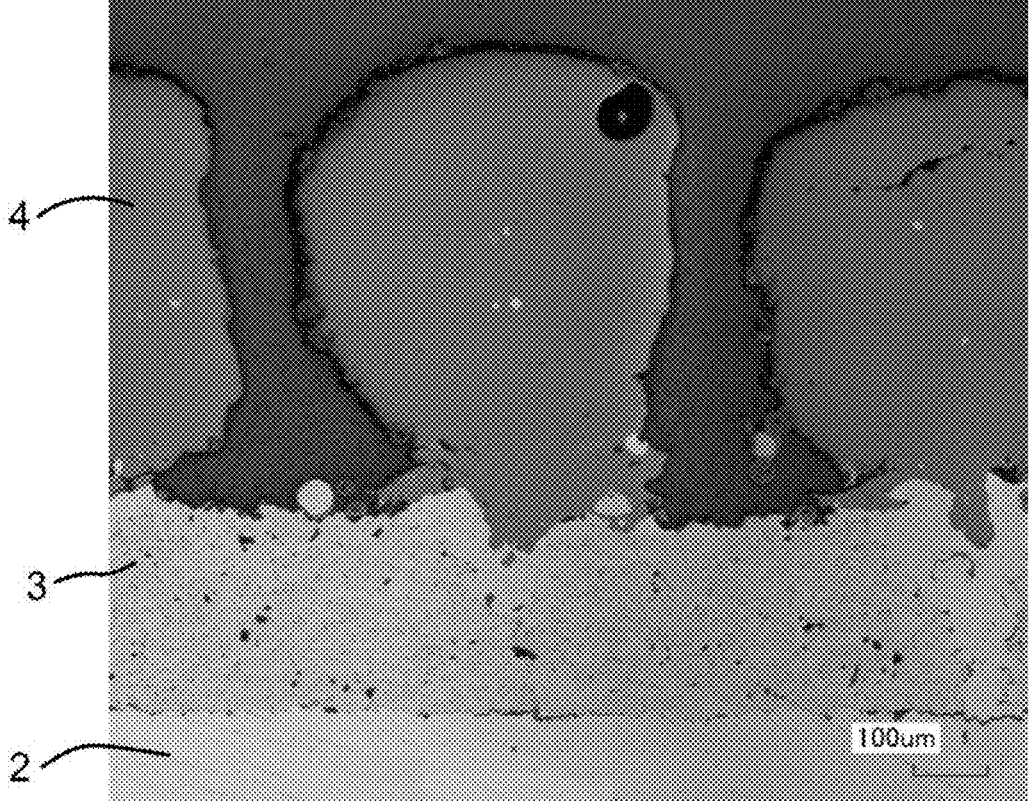
FIG. 5: Photo of a cross-section polish of another sample.

The substrate surface was a porous YSZ layer produced by thermal spraying on an Inconel 738 component with a thermally sprayed MCrAlY adhesion promoter layer, FIGS. 2-4, or a vacuum plasma sprayed MCrAlY adhesion promoter layer on structural steel, FIG. 5.

Thus, thermal barrier layers of different dimensions were produced on different substrates. Both the case where substrate comprised an adhesion promoter layer with a thin ceramic layer on top and the case where columns were prepared directly on the adhesion promoter layer were investigated.

FIG. 2 shows a photographic image of columns 4 produced as previously described on a substrate from above. The columns 4 form a thermal barrier layer for the substrate below. A comparison substrate of basically the same structure was produced, but in which the thermal barrier layer was applied in a conventional manner by a gas deposition process. This reference sample had a conventionally produced thermal barrier layer with a thickness corresponding to the total thickness of the thermal barrier layers of the sample produced as intended.

Two systems produced in this way, as shown in FIG. 2, were tested in thermocycling experiments. The ceramic front side, i.e. the thermal barrier layer, of the respective sample was heated with a gas burner, while the back side was cooled with compressed air. For thermocycling, the gas burner was removed from the front side at regular intervals. The temperature of the front side was measured with a pyrometer. The temperature of the back side of the sample was determined using a thermocouple in the sample. The two tested thermal barrier layers according to the invention failed after 2264 and 1725 cycles of 5 min heating and 2 min cooling, respectively, at 1300° C. front side temperature for the first sample and 1400° C. front side temperature for the second sample. The mean temperature of the adhesion promoter layer during the heating phase was 1077° C. and 1082° C., respectively, while the back side of the substrate was cooled to 1050° C. on average in each case. FIG. 3 shows such a sample after 2264 cycles exposed to a temperature of 1300° C. It can be seen that the thermal barrier layer 4 is partially no longer present.

The thermal insulation, as can be seen from the temperature difference between the front and rear sides, corresponded to the thermal insulation of the similarly constructed reference sample not according to the invention. However, a longer service life was achieved, since only up to 1200 cycles were possible in the case of the comparison sample.

The layer thicknesses of the samples according to the invention were determined after thermocycling on the basis of cross-section polishes. One such cross-section polish is shown in FIG. 4. FIG. 4 illustrates the presence of a cavity 11 at each outer end of the columns 4. The extension of the cavities ranged from about 50 μm to 150 μm, as illustrated by FIG. 4. The columns 4 had a height and diameter of about 400 μm to 450 μm, as shown by FIG. 4. FIG. 4 also shows that there was spacing between the columns 4. Examination of the sample shown in FIGS. 3 and 4 revealed that the system failed at the interface of non-columnar ceramic coating 12 and adhesion promoter layer 3. The bond between the ceramic coating 12 and the columns 4 was maintained.

The photographic image shown in FIG. 4 with the added scale shows that the ceramic coating 12 was approximately 150 μm thick and the adhesion promoter layer 3 was approximately 300 μm thick. The distance between two columns was always at least 10 μm.

Direct coating of an adhesion promoter layer 3 with columns 4 is also possible. This is shown by the photograph of a cross-section polish through another prepared sample in FIG. 5. The surface of the substrate, i.e. the surface of the adhesion promoter layer 3, was first pretreated with a pulsed laser beam to melt the surface. Thus, a good adhesion of the columns 4 to the adhesion promoter layer 3 could be achieved. The adhesion promoter layer was approximately 300 μm thick. Columns four were approximately 600 μm high and up to 550 μm wide. The material of the columns 4 showed isolated small pores. However, the vast majority of the material was dense. Without exception, there were clear distances of at least 50 μm between the columns 4.

Figure 6:
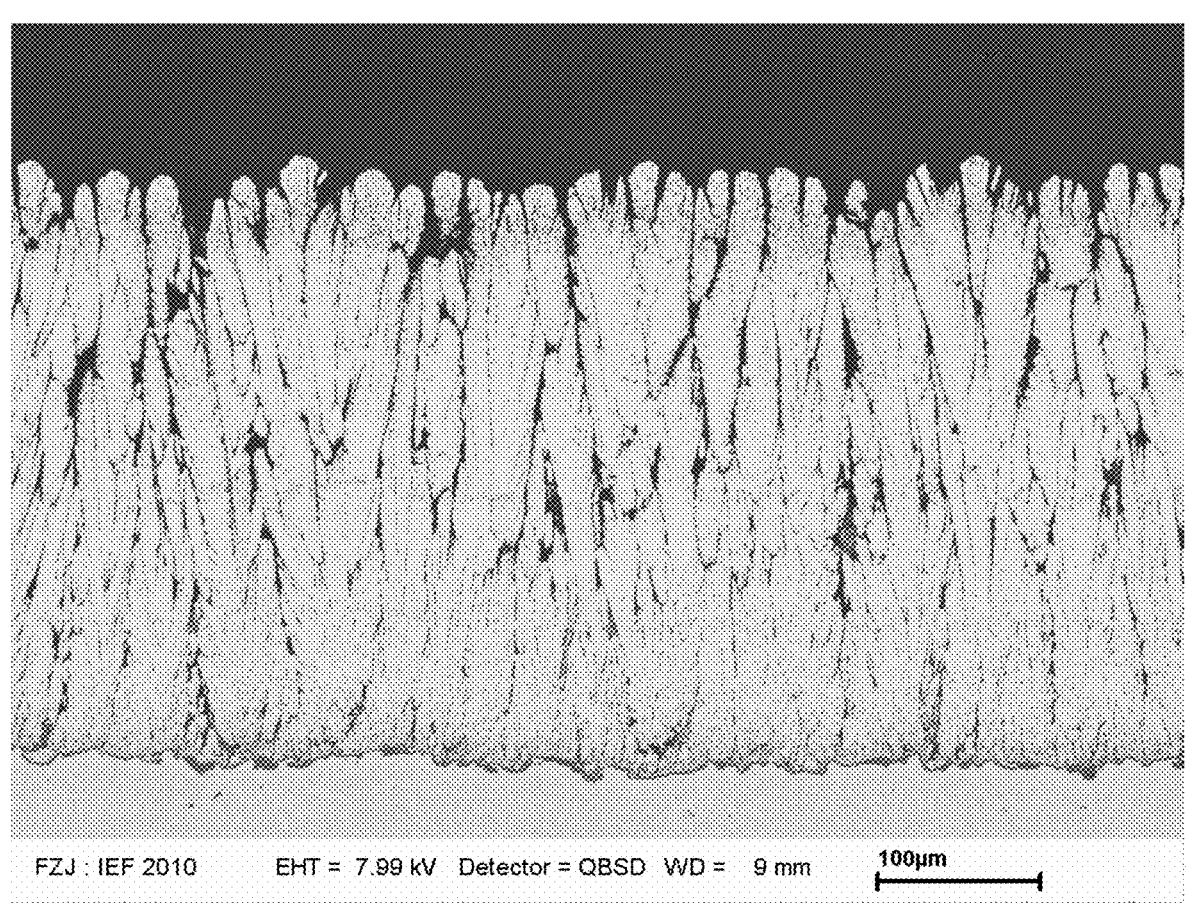
FIG. 6: Photo of a cross-section polish of a sample not according to the invention, produced by EB-PVD (electron beam physical vapor deposition)

FIG. 6 shows a comparative example, not according to the invention, of a columnar YSZ thermal barrier layer produced by EB-PVD on a substrate. The comparative example illustrates that it is not possible to produce columns in a comparably controlled and uniform manner by EB-PVD. The shapes of the columns are very irregular. The columns can branch irregularly above the substrate. The upward gradients ($V_z$ direction) are very irregular and point in different directions. In particular, at the underside of the thermal barrier layer, there are very few gaps between two adjacent columns. The columns therefore contact each other at least predominantly, particularly at the substrate. A regular arrangement of the columns according to a pattern is not present. The material is cracked and porous. The bonding of the spring-like structures in the lower region of the thermal barrier layer is less stable than any of the columns produced according to the invention.

Figure 7:
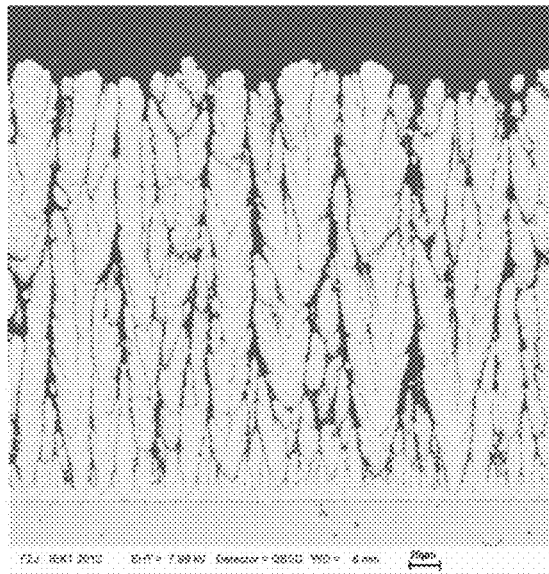
FIG. 7: Photo of a cross-section polish of a sample not according to the invention, produced by PS-PVD (plasma spray-physical vapor deposition)

FIG. 7 shows a comparative example, not according to the invention, of a columnar YSZ thermal barrier layer produced by PS-PVD on a substrate. The result is similar to that shown in FIG. 6. By PS-PVD it is also not possible to produce columns in a controlled manner comparable to the invention. Especially at the underside of the thermal barrier layer, the columns produced by PS-PVD inevitably contact each other extensively. A regular arrangement of the columns according to a pattern is not present. The material is riddled with cracks. Comparable to the EB-PVD layers, a poorer bonding is present in the lower thermal barrier layer region.

Figure 8:
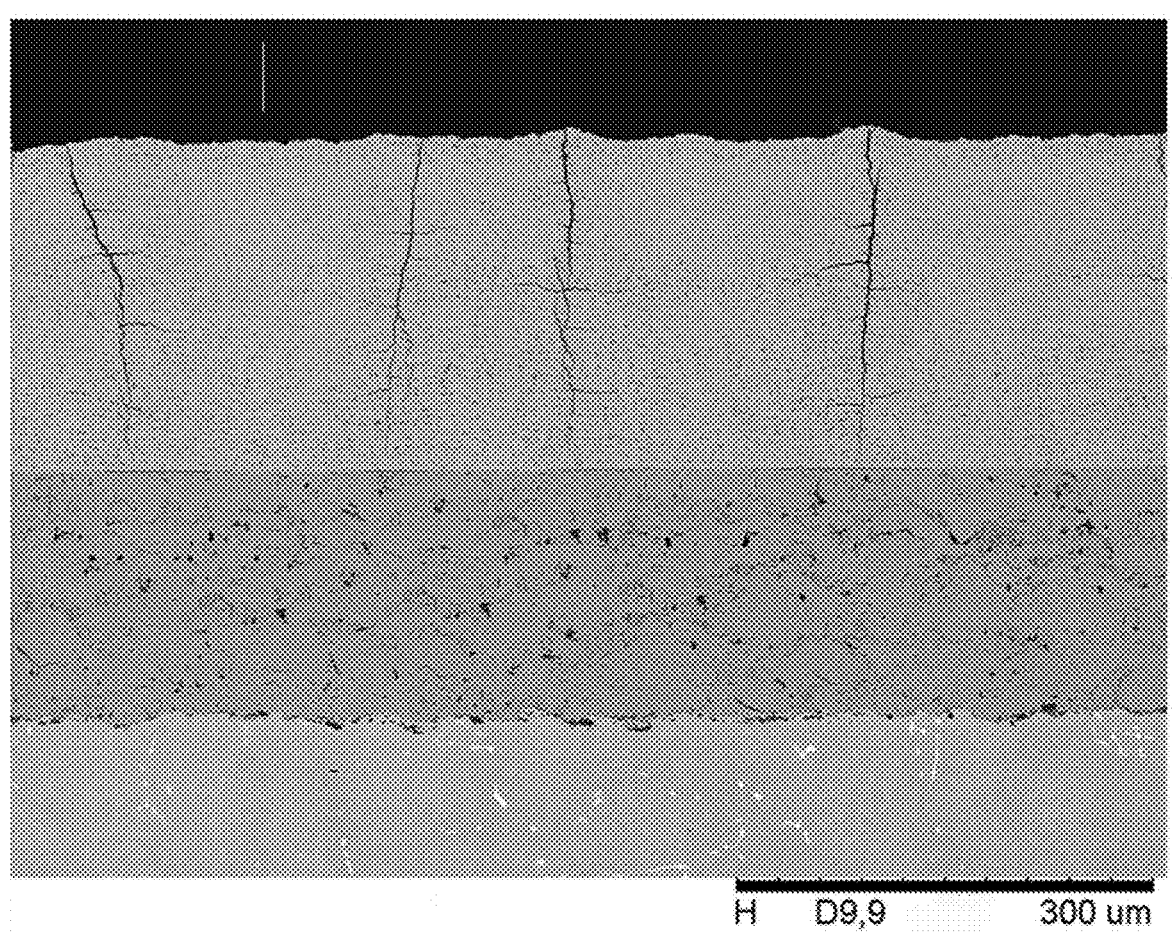
FIG. 8: Photo of a cross-section polish of a sample not according to the invention, produced by SPS (suspension plasma spraying)

FIG. 8 shows a comparative example, not according to the invention, of a columnar thermal barrier layer produced by SPS. In particular, at the underside of the thermal barrier layer, the columns produced by PS-PVD contact each other completely. Also, gaps between columns above the substrate are small. The width of a column can be more than twice the width of an adjacent column without this being selectively controllable. With the gaps, cracks inevitably occur, which can lead into the columns and thus limit the cohesion of the columns. Cracks comparable to this are not present in the columns according to the invention. The material has a closed-pore appearance, i.e. it is porous.

Figure 9:
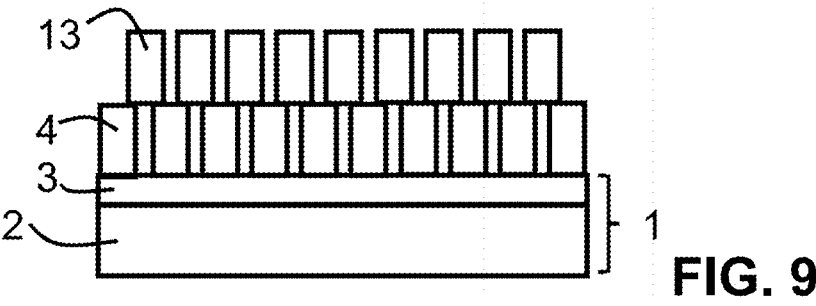
FIG. 9: Schematic representation of a system with first and second columns in different planes.

FIG. 9 schematically shows a system in which the thermal barrier layer is formed by first and second columns 4, 13. The second columns 13 have been applied to the first columns 4 by laser welding. The second columns 13 are offset from the first columns 4. This creates air chambers between the first columns 4, which are at least partially closed off from the outside of the thermal barrier layer by the second columns 13. The heat insulating properties can thus be improved.

Figure 10:
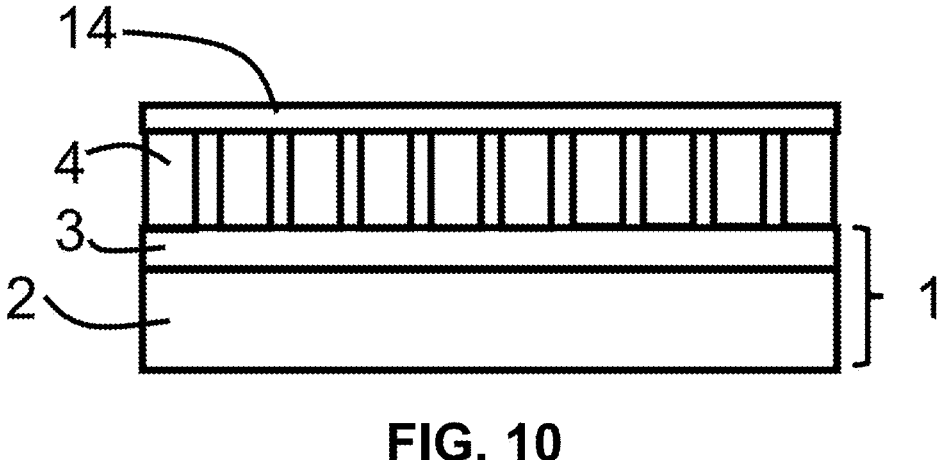
FIG. 10: Schematic representation of a system with a top layer above columns.

FIG. 10 schematically shows a system in which the columns 4 on the outside of the thermal barrier layer are shielded from the outside by a cover layer 14. This improves thermal insulation and protects the interior of the thermal barrier layer from contamination. The cover layer 14 may be completely closed.

Figure 11:
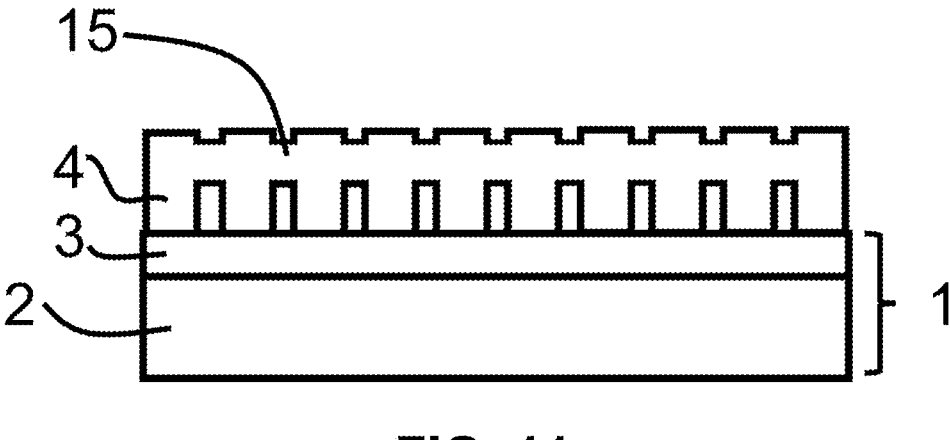
FIG. 11: Schematic representation of a system with widenings of columns in a central area.

FIG. 11 schematically shows a system in which the columns have been widened close to the outside of the thermal barrier layer. The widening 15 creates a kind of layer that protects against contamination and improves thermal insulation. The layer may be completely closed. However, it may also be a layer that is predominantly closed.

Figure 12:
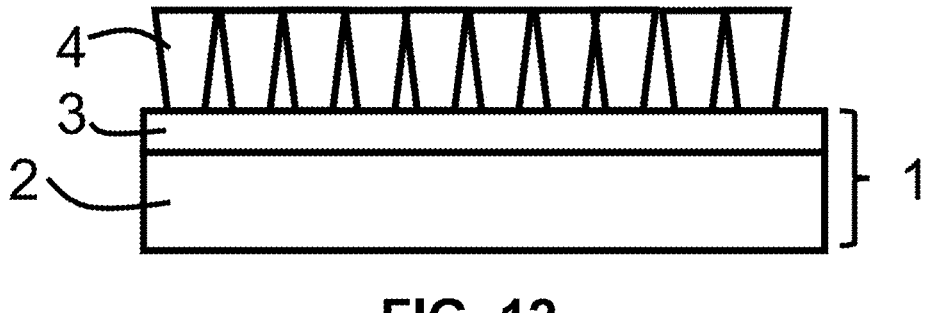
FIG. 12: Schematic representation of a system with widenings of columns to the outside of thermal barrier layer.

FIG. 12 schematically shows a system in which the columns have been produced in a cone-like widened manner towards the outside of the thermal barrier layer. In this way, a kind of closed or at least partially closed layer can be formed on the outside of the thermal barrier layer, which protects against contamination and improves thermal insulation.

Figure 13:
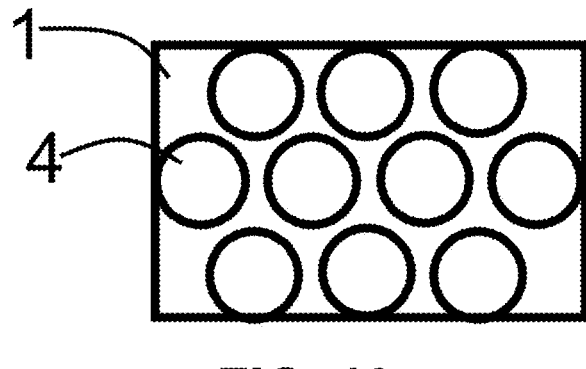
FIG. 13: Schematic top view on columns of a system.

The schematic view according to FIG. 13 shows that the columns 4 can be arranged uniformly according to a pattern. This is not possible with conventional manufacturing processes. Thus, a first row of columns 4 can be manufactured with the columns being substantially equally spaced from one another. A second row of such columns 4 may be arranged adjacent thereto. As shown, the second row may be arranged offset with respect to the first row in order to achieve the highest possible packing density and to be able to provide uniform protection from heat. The columns of the samples shown in FIGS. 2 to 4 have been produced according to this arrangement.

Figure 14:
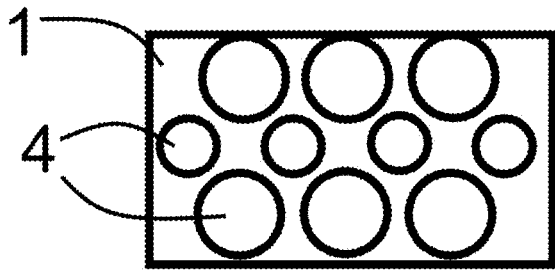
FIG. 14: Schematic top view on columns of a system with varying diameters.

The schematic top view according to FIG. 14 shows that the columns 4 can be arranged uniformly according to a pattern and can have different diameters in order to be able to selectively adjust the width of air cushions. Rows of columns with small and large columns alternate. Such patterns are not possible with conventional manufacturing processes.

Figure 15:
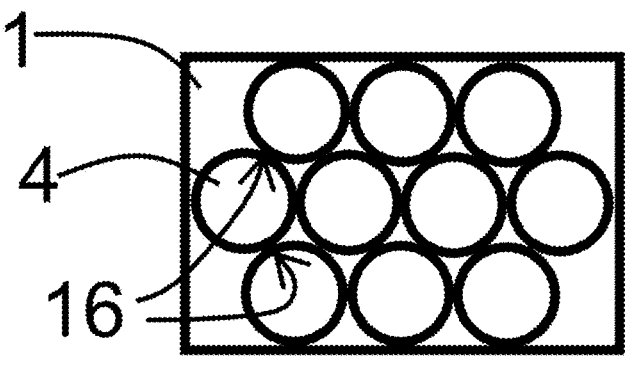
FIG. 15: Schematic top view on columns of a system with hardly contacting columns

FIG. 15 is a schematic top view of a system and shows the case where the columns 4 hardly contact each other. The columns 4 are arranged uniformly according to a pattern. For the most part, the surfaces of the columns 4 at the substrate 1 do not contact each other. Also, the columns 4 always contact each other in approximately the same way, i.e., also in the manner of a pattern. The idealized columns 4 shown are circular and have the same diameters. A column 4 therefore has a total of up to six contact points 16 to adjacent columns 4. Each contact point 16, viewed along the circumference, is several times smaller than the circumference of the respective column, as illustrated by FIG. 15. Even if all contact points 15 seen along the circumference are added up, then the result of the sum is clearly smaller than half the circumference of the respective column 4.

Figure 16:
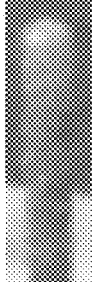
FIG. 16: Photo of a homogeneously produced column.

FIG. 16 shows a photograph of a very homogeneous column which has been produced step by step with the aid of a pulsed laser. The duration of a laser pulse is preferably between 0.1 and 0.5 seconds. In the case of the column shown in FIG. 16, the duration of the laser pulses was 0.2 seconds. The time between two pulses was one or two seconds. However, a pause between two laser pulses could also be longer and be, for example, four or five seconds long. Gradually, the focus of the laser and the powder feed in position were adjusted during these pauses between two laser pulses. A pause of 1 to 2 seconds between two pulses is sufficient to change the powder material. Thus, through the invention, a very homogeneous column can be produced which can be formed from different materials.

The invention claimed is:

1. A system comprising a substrate and a ceramic thermal barrier layer formed of first columns applied directly to an upper surface of the substrate, wherein each first column comprises a ceramic material, wherein each first column comprises a first portion of the ceramic material adjacent to the substrate which does not contain any cavities produced in the ceramic material and a second portion of the ceramic material spaced apart from the substrate that includes at least one cavity produced in the ceramic material, wherein the first columns are spatially separated from each other at the upper surface of the substrate by a gap having a distance of at least 5 μm, wherein the ceramic material is non-porous.

2. The system according to claim 1, wherein a diameter of at least one of the first columns is larger than 0.1 mm.

3. The system according to claim 1, wherein the first columns have a widening.

4. The system according to claim 3, wherein the first columns are connected to each other in a layer-like manner by one of: widenings above the substrate or a layer that is applied to the first columns.

5. The system according to claim 1, wherein the ceramic thermal barrier layer comprises second columns spatially separated from each other and applied to the first columns, wherein the second columns are arranged offset with respect to the first columns, and wherein the second columns comprise the ceramic material.

6. The system according to claim 1, wherein the upper surface of the substrate is formed by an adhesion promoter layer or by a ceramic layer on an adhesion promoter layer.

7. The system according to claim 6, wherein the upper surface of the substrate is formed by the adhesion promoter layer applied to a component consisting of a metal.

8. The system according to claim 1, wherein the ceramic thermal barrier layer consists of yttrium-stabilized zirconium oxide.

9. The system according to claim 1, wherein the first columns are produced by laser welding.

10. The system according to claim 1, wherein the first columns are arranged according to a uniform pattern.

11. The system according to claim 1, wherein a diameter of at least one of the first columns is larger than 0.3 mm.

12. The system according to claim 1, wherein a diameter of at least one of the first columns is smaller than 0.9 mm.

13. The system according to claim 1, wherein a diameter of at least one of the first columns is larger than 0.1 mm and smaller than 0.9 mm.

14. The system according to claim 1, wherein a diameter of at least one of the first columns is smaller than 0.7 mm.

15. The system according to claim 1, wherein a diameter of at least one of the first columns is larger than 0.3 mm and is smaller than 0.7 mm.

16. The system according to claim 1, wherein the extension of the at least one cavity is at least 50 μm.

17. The system according to claim 1, wherein the ceramic material comprises one or more pores due to manufacturing defects, wherein the pores are smaller than the at least one cavity.

\* \* \* \* \*